Patented May 15, 1934

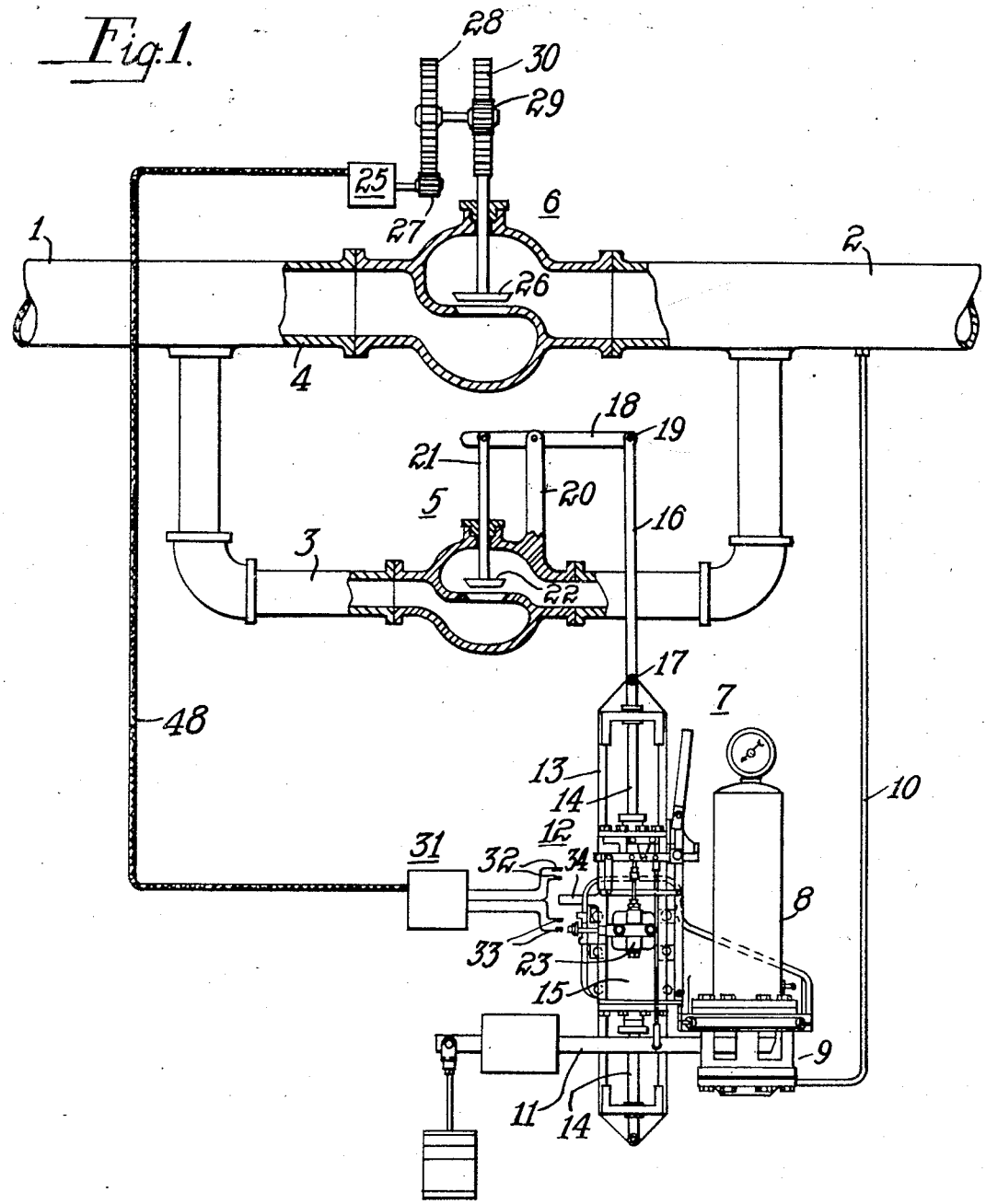

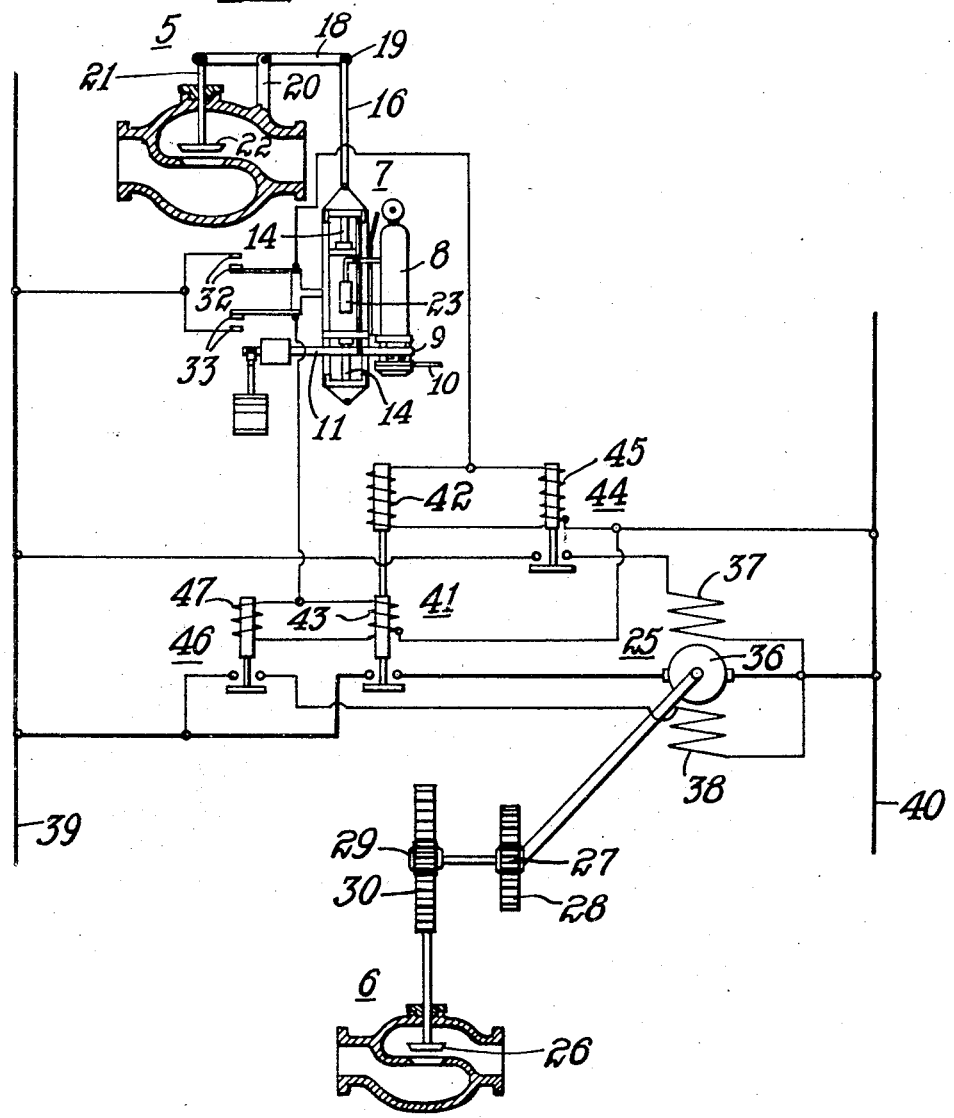

1,958,644

UNITED STATES PATENT OFFICE 1,958,644

METHOD OF AND APPARATUS FOR REDUCING FLUID PRESSURES

George W. Smith, Pittsburgh, Pa., assignor to John M. Hopwood, Dormont, Pa.

Application December 11, 1930, Serial No. 501,739

9 Claims. (Cl. 50—16)

This invention relates to systems for conveying fluid such as steam under pressure in which fluid in parts or sections of the systems is maintained at a high pressure and transmitted to other parts or sections thereof at reduced pressure. The invention relates more particularly to the method of transmitting the fluid or steam to the reduced pressure sections of the system, and also to the apparatus for so controlling the pressure reducing instrumentalities that the pressure in the reduced presure sections may be maintained substantially constant at a predetermined value irrespective of the demand for fluid or steam therefrom.

The invention may be utilized also to control the position and operation of unloading valves employed in systems where it is important or desirable, for operating reasons, to maintain the pressure of the fluid or steam, on the up-stream side of the valves, at a substantially constant predetermined value. In such applications, the unloading valves operate to pass or divert such amounts or quantities of fluid or steam, usually into a low or reduced pressure section, as may be required to maintain the pressure substantially constant on the up-stream side of the valves.

In steam power plants for boilers generating steam at high gauge pressures, operating conditions often arise requiring a reduction of the pressure of the steam as generated by the boilers to a relatively low pressure, as compared to the pressure of the steam at the boilers, in order that such steam or fluid may be utilized in connection with apparatus designed to operate on low pressure steam or fluid. For operating reasons, such as the maintenance of high over-all plant efficiency, it is necessary to maintain the boiler pressure relatively constant; also, the pressure to which a part or all of the steam or fluid is reduced must be maintained at a substantially constant value.

Ordinarily, reducing or throttle valves are utilized to reduce, or convert the high presure steam to low pressure steam or fluid. If the pressure of low pressure steam is to be maintained substantially constant, the valves are opened and closed increasing or decreasing the flow of steam from the high to the reduced pressure lines according as the pressure falls below or raises above the pressure to be maintained in said low pressure lines.

In practice, the throttle valves employed for such purposes, are operated by motors controlled by regulators or devices operating in response to the pressure in the low pressure lines. The pressure responsive devices are so arranged that they will cause the motors to open or close the valves as the pressure falls or rises permitting the flow of a larger quantity of steam through the valves when the pressure in the low pressure lines falls below a predetermined value and decreasing the quantity flowing in case the pressure rises above the pressure sought to be maintained substantially constant at such value.

Where large quantities of steam or fluid must be passed to the low pressure system to satisfy requirements existing at a particular time, and relatively small quantities of steam or fluid at other times, a large reducing valve is required and must be of such capacity that it can pass the largest or greatest quantity flow of steam or fluid demanded from the low pressure system. If such valves are operated by electric motors through gear reduction mechanisms, they cannot be opened and closed quickly enough to follow the pressure variations in the low pressure lines caused by variations in demand for low pressure steam or fluid. For this reason the pressure in the low pressure line would depart from that substantially constant value sought to be maintained. On the other hand, if the electric motors are large enough to permit of quickly opening and closing the valves, the cost of power required for their operation would make their use prohibitively expensive.

Throttling valves may also be operated by hydraulic or pneumatic motors, but if such motors are to be large enough to handle the work required of them, the cylinders and pistons thereof must be of large diameters. In such cases, the stroke of the pistons would be excessive, and possibly high cylinder pressures would be required for their operation; hence such motors would not be satisfactory. Ordinarily, hydraulic or pneumatic motors are extremely satisfactory because of their speed of operation, accuracy of control and non-hunting characteristics.

Valves operated by electric motors operating through reduction gearing are satisfactory where the valves would be operated only at infrequent intervals. Hydraulic or pneumatic type motors are also satisfactory and highly desirable for operating valves that must be opened or closed quickly and frequently, provided the power required for operating the valves is not excessive.

An object of this invention is to provide a system for reducing high pressure fluid or steam to low pressure fluid or steam in which the economic and advantageous operating characteristics of the electric motor and hydraulic or pneumatic motor operated valves may be taken advantage of without subjecting the system to the disadvantages of the respective types of valves referred to above.

A further object of the invention is the provision of a steam pressure reducing system that permits the use of a pneumatic or hydraulic operated valve of moderate or small size for regulating the pressure to be maintained in the reduced pressure line or system, and to employ an electric motor operated valve arranged to operate at infrequent intervals where large changes in quantity steam or fluid flow is required.

A further object of this invention is the provision of a system in which steam or fluid under high pressure flows through branch lines, having reducing or throttling valves therein, to a reduced pressure line in which one of the reducing valves operates to regulate the pressure in the reduced pressure line and at the same time initiates and controls the operation of another of said valves located in a parallel branch line.

And a still further object of the invention is to provide for controlling a motor operated valve, embodied in a system of the type referred to above, at such times and under such conditions that the valve controlled in accordance with the pressure in the low pressure section, is not capable of maintaining the pressure of the fluid or steam in the low pressure section at a substantially constant value.

Other objects of the invention will, in part, be apparent and will, in part, be obvious from the following description taken in conjunction with the accompanying drawings in which:

Figure 1 is a view of circuits and apparatus arranged and constructed in accordance with the invention; and Fig. 2 is a schematic diagram of circuits and apparatus illustrating the manner in which the operation of an hydraulic or pneumatic motor operated valve may be utilized to control the operation of an electric motor operated valve, in accordance with the invention.

Throughout the drawings and the specification like reference characters indicate like parts.

Referring to Fig. 1 of the drawings, a pipe line 1 having therein steam or fluid at relatively high pressure and a pipe line 2 having therein steam or fluid at a relatively low or reduced pressure are shown. Steam or fluid at high pressure flows from pipe line 1 to pipe line 2 through branches 3 and 4 having reducing or throttling valves 5 and 6 therein. Branch line 3 and valve 5 are preferably of such capacity that a fractional amount of the amount of total steam or fluid required by pipe line 2 may be passed therethrough from line 1 to line 2. Also valve 5 is of such capacity, that for reduced requirements, it may regulate the flow of steam or fluid through branch line 3 in such a manner that the pressure in line 2 may be maintained at a substantially constant predetermined value.

Branch line 4 and valve 6 therein are preferably of such capacity that all of the steam or fluid available in line 1 may be passed or transmitted to the reduced pressure line 2 when the demand for reduced pressure steam or fluid in line 2 is equal to the capacity of the high pressure line. Under ordinary conditions of demand for steam or fluid on line 2, valve 6 remains in a predetermined position and such position is changed but infrequently. Valve 6 may be operated only at such times as valve 5 becomes incapable of passing the amount of steam or fluid from line 1 through branch line 3 to pipe line 2, to satisfy the conditions of demand, and, at the same time, maintaining the pressure in line 2 substantially constant at a predetermined value.

Valves 5 and 6, as illustrated, are preferably of the tight seating type. In practice, valve 5 may be designed for such capacity that when open, from 5% to 33% of the quantity of steam or fluid that may be required, can pass therethrough from line 1 to line 2. For ordinary reduced conditions of demand, the valve will then be capable of so controlling the steam flow that the pressure in line 2 may be maintained substantially constant. However, valve 5, it will be understood, may be designed for other capacities depending upon particular requirements of any particular application.

In order that valve 5 may be opened and closed to permit such quantities of steam to flow from line 1 through branch line 3 to the reduced pressure line or section 2, to satisfy the conditions of demand for steam or fluid and at the same time maintain the pressure in line 2 substantially constant for ordinary reduced conditions of demand, a regulator 7 is provided. Regulator 7 is of the type shown and described in United States Patent No. 1,371,243, granted to John M. Hopwood, on March 15, 1921. Since the regulator is fully described in this patent, only a brief description thereof need be given here.

Regulator 7 comprises, in general, an air chamber 8 having a pressure responsive member therein, as at 9, connected to the pipe line 2 through a pressure line 10. Element 9, as disclosed in the patent, is responsive to the pressure of the steam in the reduced pressure line or section 2 and operates substantially directly in accordance with changes in pressure therein. Pressure regulator 7 has a weight arm 11 operated by the pressure responsive member at 9, in accordance with changes in pressure in the pipe line 2.

Movements of weight arm 11 are utilized to control the operation of an hydraulic or pneumatic motor or regulator 12 having a frame 13 operatively connected to piston rods 14 of a piston disposed in a cylinder 5. Frame 13 is arranged to operate valve 5 by means of a link 16 pivotally connected to the frame as at 17 and a lever 18 pivotally connected to rod 16 as at 19. Lever 18 may be pivotally mounted on an upright 20 attached to the valve body of valve 5; the opposite end thereof being connected to a valve stem 21 that raises and lowers disc 22 of the valve.

As described in the patent to John M. Hopwood No. 1,371,243, movements of the weight arm 11 are utilized to control or operate a valve 23 through a system of levers connecting said arm and valve. As the pressure in line 2 increases above a predetermined value, pressure is admitted into cylinder 15 on the bottom side of the piston therein so that frame 13 will move upwardly thereby moving valve disc 22 towards its closed position, reducing the quantity of steam flowing to line 2. If the pressure in line 2 falls below the predetermined value to be maintained therein, weight arm 11 will move downwardly operating valve 23 in such a direction that the pressure will be admitted at the top side of the piston in cylinder 15 thereby moving frame 13 downwardly. As frame 13 moves downwardly, valve disc 22 is moved upwardly to such a position that the amount of steam required in pipe line 2 may pass therethrough to maintain the pressure in said line at a substantially constant value.

Valve 6 being of relatively large size and capacity and since, as stated hereinbefore, this valve 5 may be operated only at infrequent intervals, an electric motor 25 is provided for operating valve disc 26 of valve 6 to open and closed positions in order to satisfy the requirements for steam or fluid in pipe line 2. Motor 25 operates upon the valve stem of disc 26 through a pinion 27, gear 28 and pinion 29 that meshes with rack 30 attached to the stem of the valve disc. The direction and operation of motor 25 may be controlled by a reversing mechanism 31. The reversing mechanism 31 may be controlled by normally open contact members 32 and 3 and an arm 34 carried by a frame 13 of regulator 7.

Where the demand for steam from pipe line 2 is such that the capacity of valve 5 is sufficient to control the quantity of steam or fluid flowing from pipe line 1 to satisfy the demand requirements and at the same time maintain the pressure in line 2 substantially constant, at a predetermined value, then valve 6 remains stationary in any predetermined position. However, if the demand requirements in pipe line 2 are such that valve 5 is incapable of maintaining the pressure therein at a substantially constant predetermined value, then regulator 7 will move to such a position that operation of valve 6 will be occasioned. The motor 25 will actuate valve 6 in such a direction that it will either decrease the amount of steam flowing through branch line 4, in case the pressure in line 2 rises to a value beyond the range of control of valve 5, or to increase the flow of steam or fluid through line 4 in case the pressure in line 2 falls below a value which cannot be restored by valve 5 operating alone.

For example, if the pressure of the steam or fluid in line 1 is at 450 pounds per square inch and it is desired to maintain the pressure in line 2 at a reduced value as, for example, 150 pounds per square inch, then, so long as the quantity of steam demanded of line 2 does not exceed the capacity of valve 5 within its pressure regulating range, valve 5 will be operated towards its open or closed positions to either increase or decrease the amount of steam flowing to line 2. Valve 5 operating in this manner, will so control the flow of steam or fluid that the pressure in line 2 will be maintained at a substantially constant predetermined value.

If the demand for steam on line 2 increases to such a value as to affect a reduction of the pressure therein below 150 pounds per square inch, regulator 7 will operate to open valve 5 an amount sufficient to restore the pressure in line 2 to the 150 pounds pressure. If, however, the opening of valve 5 will not permit sufficient steam to flow through branch line 3 into line 2 to restore the pressure to the desired value, frame 13 of regulator 7 will move downwardly until arm 34 closes contact members 33. Upon the closure of these contact members, motor 25 will be energized and caused to operate in such a direction that valve disc 26 will open. Valve 6 will open to that position in which sufficient steam or fluid may flow through branch line 4 to restore the pressure in branch line 2 to 150 pounds per square inch. If the operation of motor 25 continues until the pressure in line 2 has slightly exceeded the value of 150 pounds per square inch, regulator 7 will operate to actuate valve 5 towards its closed position thereby reducing the amount of steam delivered to line 2. As valve 5 is being moved towards its closed position, frame 13 carries arm 34 upwardly and away from contact members 33 permitting them to open whereby motor 25 is stopped.

In this case the motor 25 is stopped, holding valve 6 in a position in which valve 5 is capable of supplying the steam required to maintain the pressure in line 2 at 150 pounds per square inch. Upward movement of the regulator frame 13 will cease when the pressure in line 2 has been restored to substantially the constant value of 150 pounds per square inch, or the pressure to be maintained therein.

However, if the demand for steam on line 2 changes in such a direction as to increase the pressure therein, regulator 7 will respond to such increase in pressure and cause the frame 13 to move upwardly moving valve 5 towards its closed position. If the movement of valve 5 towards its closed position does not restore the pressure in line 2 to the predetermined value to be maintained, regulator frame 13 will continue to move upwardly until arm 34 thereof closes contact members 32. Upon the closure of contact members 32, motor 25 will be energized and caused to operate in such a direction that valve 6 will be actuated towards its closed position thereby decreasing the amount of steam or fluid flowing through branch line 4. As the pressure in line 2 approaches the value to be maintained, regulator 7 will respond causing frame 13 to move downwardly until contact members 32 have been opened thereby stopping motor 35.

In any case so long as the pressure in line 2 exceeds the value to be maintained therein, regulator 7 will move to such a position that it will hold contact members 32 closed until motor 25 has actuated valve 6 to the position required to restore the pressure in line 2. Also, if the pressure in line 2 falls below the value to be maintained therein, and the opening of valve 5 by regulator 7 does not restore the pressure, contact members 33 will be held closed by the arm 34 of regulator 7 until the motor 25 has operated for such a length of time that valve 6 has been opened sufficiently to restore the pressure to be maintained in line 2.

In Fig. 2 of the drawings, the electrical circuits and apparatus controlled by regulator 7 and which in turn govern the operation of motor 25 are illustrated schematically. Motor 25, as illustrated in Fig. 2, is of the reversing type and may be operated in either direction. For purposes of illustration a simple form of reversing motor is shown that comprises an armature 36 and field windings 37 and 38. When field winding 37 and armature 36 are connected across supply conductors 39 and 40, motor 25 will operate in one direction and when the armature and field winding 38 are connected across the supply conductors the motor will operate in the opposite direction. In this particular case, it may be assumed that when field winding 37 and armature 36 are connected across the supply conductors, the motor will operate in such a direction as to lower valve disc 26 and that when field winding 38 and armature 36 are connected across the supply conductors, the motor will operate in the opposite direction to raise valve disc.

In order that the armature winding of motor 25 may be connected across the supply conductors, a switch 41 is provided which is operable to closed or circuit breaking position by solenoids 42 and 43. Solenoid 42 is energized to close switch 41 when contact members 32 of regulator 7 are closed while solenoid 43 is energized to close the switch when contact members 33 of the regulator are closed.

In order that the field winding 37 may be connected across the supply conductors when contact members 32 of the regulator are closed, a solenoid operated contactor 44 is provided. Coil 45 of contactor 44 may be connected in parallel with the solenoid 42 of switch 41 so that when contact members 32 of regulator 7 are closed, switch 41 and contactor 44 will close simultaneously or practically so. In this case, upon the closure of contact members 32, switch 41 and contactor 44 will close connecting armature winding 36 of the motor and field winding 37 across the supply conductors. As stated hereinbefore, contact members 32 will close when the frame of the regulator 7 has moved upwardly a predetermined amount in response to an increase in pressure in the reduced pressure line 2 above that substantially constant value to be maintained therein.

In order that field winding 38 of motor 25 may be connected across the supply conductors when contact members 33 of the regulator 7 are closed, a solenoid operated contactor 46 is provided. Coil 47 of the contactor 46 may be connected in parallel with solenoid 43 of switch 41 so that when contact members 33 are closed switch 41 and contactor 46 will close simultaneously or practically so. When contactor 46 and switch 41 are closed, the armature winding 36 and field winding 38 of the motor will be connected across supply conductors 39 and 40 whereby motor 25 will operate in such a direction as to raise valve disc 26 of valve 6, permitting more steam or fluid to flow through branch line 4 into reduced pressure line 2, and restoring the pressure therein to the particular value to be maintained substantially constant therein.

The circuit conductors illustrated schematically in Fig. 2 while not individually illustrated in Fig. 1 may be connected between control element 31 and motor 25 and located in a sheath or conduit 48.

The control element designated generally at 31 in Fig. 1 may be understood to comprise the contactors and switches illustrated in Fig. 2 for controlling the operation of motor 25. While a particular electrical control system has been illustrated schematically, it is to be understood that any form of circuit controller may be utilized that will serve the requirements and purpose intended.

It has been stated hereinbefore that valve 6 may be materially larger than valve 5, yet these valves may be of the same size or of different sizes depending upon the requirements of the application to which this system may be applied.

In case the system, illustrated in the drawings and described herein, is to be utilized to maintain a substantially constant predetermined pressure at the upstream side of valves 5 and 6, or in other words in pipe line 1, pipe line 10 may be connected to pipe line 1. When so connected, regulator 7 will be actuated in accordance with changes in pressure in the high pressure system; and valves 5 and 6 will function as unloading valves to divert such amounts of steam or fluid to low pressure line 2 as may be required to maintain the pressure in the high pressure system substantially constant.

Where pressure regulator 7 is connected to pressure line 1, the lever arrangements, it will be understood, must be so changed, that valves 5 and 6 will open in response to increases of pressure in line 1, and close in response to reductions of pressure therein; the operation of the valves being opposite to that obtained when regulator 7 is connected as shown in the drawings. In this case also, contact members 32 and 33 will be interchanged.

It will be observed from the aforesaid, that one of the valves employed, is operated by a pressure responsive element, while the other valve is controlled in accordance with the position of the former.

While but one form of the invention has been shown and described, it will be apparent to those skilled in this particular art that various modifications and changes may be made therein without departing from the spirit and the scope of the invention. It is desired, therefore, that only such modifications shall be placed on the invention as are imposed by the prior art and the appended claims.

What I claim as new and desire to secure by Letters Patent is:

1. In combination, a pipe line having high and reduced pressure sections and a valve therein between said sections, an electric motor for operating said valve, a by-pass having communication with said pipe line at opposite sides of said motor operated valve, a valve in said by-pass, a regulator responsive to pressure changes in the reduced pressure sections for operating said by-pass valve, and means operated by said regulator, when the pressure in said reduced pressure section rises above or falls below a predetermined value, under conditions of demand upon the reduced pressure sections, for controlling the operation of said motor so that as the pressure in said reduced pressure section falls below a predetermined value, the motor operates to open the valve in the pipe line, and as the pressure in said reduced pressure section exceeds a predetermined value, the motor operates to close said pipe line valve.

2. In combination with fluid supply line having high and reduced pressure sections, a valve in said line between said sections, an electric motor for operating said valve, a by-pass in said line connecting said high and reduced pressure sections at opposite sides of the motor operated valve, a valve in said by-pass, a pressure actuated device responsive to changes in pressure in the reduced pressure section for operating said by-pass valve in response to a departure of the pressure in the reduced pressure section from a predetermined value, and means controlled by said pressure regulator for energizing and controlling the direction of operation of said electric motor when the pressure in said reduced pressure section has departed a predetermined amount from the pressure to be maintained therein.

3. In combination with fluid supply line having high and reduced pressure sections, a valve in said line between said sections, an electric motor for operating said valve, a by-pass in said line connecting said high and reduced pressure sections at opposite sides of the motor operated valve, a valve in said by-pass, a pressure actuated device responsive to changes in pressure in the reduced pressure section for operating said by-pass valve in response to a departure of the pressure in the reduced pressure section from a predetermined value, means controlled by said pressure regulator for energizing said motor for operation in a direction to open the valve controlled thereby when the pressure in the reduced pressure section decreases a predetermined amount below the pressure to be maintained therein, and means controlled by said regulator for energizing said motor for operation in the opposite direction to close the valve actuated thereby, when the pressure in said reduced pressure section exceeds the pressure to be maintained therein.

4. In combination with a fluid transmission system having a high pressure section and a reduced pressure section, and a plurality of flow lines connecting said sections through which fluid may flow from the high to the reduced pressure section, of a valve in one of said lines, an electric motor for operating said valve, a valve in another of said lines, a pressure device for actuating said last mentioned valve, said device being responsive to pressure variations in the reduced pressure section, and means under the control of said regulator for governing the energization and the direction of operation of said electric motor in response to the pressure in said reduced pressure section departing a predetermined amount from a pressure to be maintained therein.

5. In combination, a pipe line having high and reduced pressure sections and a valve therein between said sections, an electric motor operating said valve, a by-pass having communication with said pipe line at opposite sides of said motor operated valve, a valve in said by-pass, means responsive to pressure variations in one of said sections for operating said by-pass valve, and means affecting operation of said electric motor to operate the valve actuated thereby when said by-pass valve has been actuated to a predetermined position.

6. In combination, a pipe having high and reduced pressure sections and a valve therein between said sections, an electric motor operating said valve, a by-pass having communication with said pipe line at opposite sides of said motor operated valve, a valve in said by-pass, means responsive to pressure variations in one of said sections for operating said by-pass valve, and means affecting operation of said electric motor to operate the valve actuated thereby when said by-pass valve has been actuated to one of two predetermined positions.

7. In combination, a pipe line having a valve therein, motive means for operating said valve, a bypass having communication with said pipe line at opposite sides of said valve, a valve in said bypass, a regulator responsive to changes in pressure in said line at one side of the valve therein, for operating said bypass valve between predetermined limits so as to maintain said pressure substantially constant, and means under the control of said regulator for so governing the operation of said motive means that the valve operated thereby will be adjusted to such positions as will render the travel of the regulator operated valve effective to maintain said pressure substantially constant.

8. In combination, a pipe line having a valve therein, motive means for operating said valve, a bypass having communication with said pipe line at opposite sides of said valve, a valve in said bypass, a regulator responsive to changes in pressure in said line at one side of said valve therein, for operating said bypass valve between predetermined limits so as to maintain said pressure substantially constant, and means under the control of said regulator for so initiating and controlling the operation of said motive means that the valve operated thereby will be adjusted to such positions as will render travel of the regulator operated valve effective to maintain said pressure substantially constant.

9. In combination, a pipe line having a valve therein, motive means for operating said valve, a bypass having communication with said pipe line at opposite sides of said valve, a valve in said bypass, a regulator responsive to the pressure in the pipe line at one side of the valve therein having a movable member for operating said bypass valve between predetermined limits so as to maintain said pressure substantially constant, and means under the control of said movable member for effecting such operation of said motive means, at predetermined points in the travel of said movable member, that movement of the by-pass valve between said predetermined limits is effective to maintain the pressure, to which said regulator responds, substantially constant.

GEORGE W. SMITH.